United States Patent [19]

Smith

[11] Patent Number: 4,467,072

[45] Date of Patent: Aug. 21, 1984

[54] RESINOUS COPOLYMER INSULATING COMPOSITIONS

[75] Inventor: James D. B. Smith, Wilkins Township, Allegheny County, Pa.

[73] Assignee: Westinghouse Electric Corp., Pittsburgh, Pa.

[21] Appl. No.: 374,583

[22] Filed: May 3, 1982

Related U.S. Application Data

[62] Division of Ser. No. 174,329, Aug. 1, 1980, Pat. No. 4,349,651.

[51] Int. Cl.³ .................................... C08L 63/00
[52] U.S. Cl. ............................ 525/117; 525/121; 525/123; 525/169; 525/199; 525/210; 525/217
[58] Field of Search ............... 525/117, 121, 203, 199, 525/210, 217, 123, 169

[56] References Cited

U.S. PATENT DOCUMENTS 2,752,318 6/1956 DeWitt ............................ 525/203

Primary Examiner—Harry Wong, Jr.
Attorney, Agent, or Firm—D. P. Cillo

[57] ABSTRACT

A water soluble addition copolymer is formed by reaction admixing a monomer having a pendant vinyl group attached to at least one ring structure selected from the group consisting of nitrogen containing heterocyclic ring structures and aromatic ring structures and their mixtures, and a monomer selected from the group consisting of maleic anhydride, fumaronitrile, tetracyanoethylene, maleimide and their mixtures, where such addition copolymer can be used alone, as curable a insulating coating composition, or can be added to a resin, to form a curable resinous insulating coating composition.

5 Claims, 3 Drawing Figures

RESINOUS COPOLYMER INSULATING COMPOSITIONS

This is a division of application Ser. No. 174,329, filed Aug. 1, 1980 U.S. Pat. No. 4,349,651.

BACKGROUND OF THE INVENTION

To improve high temperature stability and to provide better physical and electrical properties over amine cured epoxy resin systems, carboxylic acid anhydride curing agents have been found to be particularly useful with epoxy resins for high voltage insulation applications. When carboxylic acid anhydrides are used, an accelerator is usually required to give reasonable gel times at elevated temperatures. For example, Smith, et al., in U.S. Pat. No. 4,026,862, taught an epoxyanhydride insulating composition cured by separate addition of minor amounts of a quaternary onium salt, such as benzyltrimethylammonium iodide, as a latent catalyst. This composition could optionally contain an imidazole, such as 1-methylimidazole, acting as an additional latent catalyst. The system also required the use of a carboxylic acid stabilizer, to improve storage stability.

Because of higher performance requirements now demanded of epoxy resins in insulation systems and reinforced plastics, there is an ever increasing need for improved catalysts, curing agents, and insulating compositions. What is needed is an insulating composition having improved heat distortion temperatures, tensile strength, and thermal stability, particularly for high temperature bracing and insulation.

Bacskai, in U.S. Pat. No. 4,011,282, in an attempt to provide higher performing epoxies, used a copolymer of maleic anhydride and dihydrofuran, as a new type of curing agent for epoxy resin. However, the use of components having only carbon atom ring structures containing oxygen, did not provide the extreme thermal stability required for advanced technology high temperature bracing and insulation.

SUMMARY OF THE INVENTION

It has been discovered that new and improved water soluble addition copolymers, useful as insulating compositions, can be synthesized by way of copolymerization of an "electron-rich" monomer, such as, preferably, N-vinylimidazole with an "electron-deficient" monomer, such as maleic anhydride, fumaronitrile, tetracyanoethylene or maleimide. Under certain polymerization conditions, an approximate 1:1 mol. ratio of linear, alternating copolymer can be formed. These compositions are capable of catalyzing themselves, to provide spontaneous copolymerization, and can be used alone, when dissolved in water, as a curable insulating composition. They can also be used as a catalyst for epoxy resins, to form curable insulating compositions.

These compositions are water soluble addition copolymer reaction products of: (1) an "electron rich" vinyl containing monomer having a pendant vinyl group attached to at least one ring structure, the ring structure being selected from the group consisting of nitrogen containing heterocyclic ring structures, and aromatic ring structures, and their mixtures; where the aromatic ring structure may contain pendant reactive groups selected from the group consisting of amino, alkyl substituted amino, hydroxyl, alkylhydroxide and alkyl halogen groups, and (2) an "electron deficient" monomer having an olefinic group in conjunction with an anhydride, imide, or nitrile group, said compound being selected from the group consisting of maleic anhydride, fumaronitrile, tetracyanoethylene, maleimide and their mixtures.

The preferred method of copolymerization is by slow addition in a cooled reaction vessel, to form a linear copolymer precipitate that is copolymerized only through unsaturated carbon double bonds, leaving epoxy reactive groups intact. These copolymers are soluble in water and can be applied to a substrate as an aqueous solution and then cured. These copolymers can also be added to an epoxy resin, with or without additional anhydride, in the weight ratio of 6 to 60 parts epoxy resin and 0 to 6 parts organic, carboxylic acid anhydride per 1 part of linear, alternating, addition copolymer to form curable resinous compositions. In both cases, the compositions can be baked to cure.

These compositions can be used in or as vacuum impregnation compositions, spray compositions, dipping varnish compositions, or filled potting compounds. They can be used for low voltage applications, such as insulation in d.c. traction motors and the like, and for high voltage applications, such as insulation in generators and transformers. The cured compositions exhibit extremely high heat distortion temperature, extremely high thermal capability, high tensile properties, and improved solubility in water thereby offering the possibility of water based varnishes. The unique chemistry used in synthesizing these copolymer compositions enables the cure conditions of an epoxy to which they are added to be adjusted at will.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENT

Figure 1:
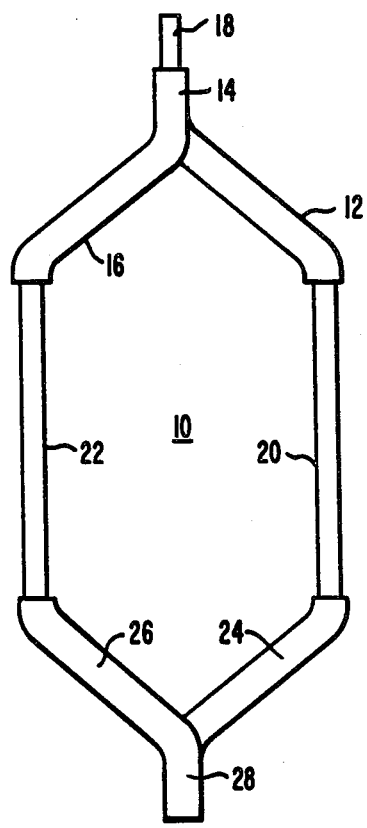
FIG. 1 shows a wrapped, resin-impregnated coil made with the resinous composition of this invention.

It has been found that selected "electron rich" monomers and "electron deficient" monomers can be made to spontaneously copolymerize, to provide compositions useful as insulating coatings. These compositions can be used alone, when solubilized in water, as an insulating composition, or used as a catalyst for epoxy resins. The useful copolymers are formed from the reaction of: (1) an "electron rich" vinyl containing monomer having a pendant vinyl group attached to at least one ring structure, and (2) an "electron deficient" monomer having an olefinic group in conjunction with an anhydride, imide, or nitrile group where olefinic is defined as unsaturated carbon double bond.

The "electron rich" compound has a ring structure selected from nitrogen containing heterocyclic ring structures, preferably: N-vinylimidazole, i.e., 1-vinylimidazole, N-vinylcarbazole and N-vinylindole, having the following respective chemical structures:

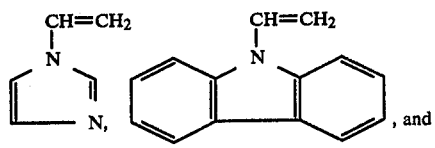

where —CH=CH$_2$ is the pendant, attached vinyl group at the apex nitrogen, as shown above. The "electron rich" monomer can also have an aromatic ring structure containing a pendant, attached vinyl group, and pendant, attached reactive groups, selected from the following chemical structures:

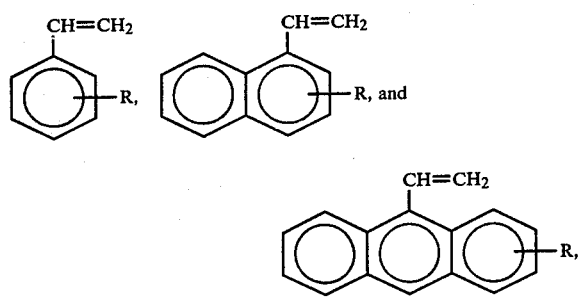

where R is selected from the group consisting of NH$_2$; NHR' where R' is an alkyl group having from 1 to 20 carbon atoms; OH; (CH$_2$)$_n$OH where n=1 to 20; and (CH$_2$)$_n$X where n=1 to 20 and x=Cl,Br,F or I. No more than one R group is attached to each monomer, whether it contains 1, 2 or 3 aromatic rings. The result of pendant vinyl attachment to the ring structures in all of the heretofore described "electron rich" monomers, is to produce a high electron density, i.e., electron richness, at the pendant vinyl group.

The "electron deficient" compound has an olefinic, unsaturated double bond group in conjunction with an anhydride, imide, or nitrile group, where the carbon double bond is attached to another unsaturated double or triple bond through a single carbon bond. These monomers are selected from the group consisting of maleic anhydride, fumaronitrile, tetracyanoethylene and maleimide, having the following respective chemical structures:

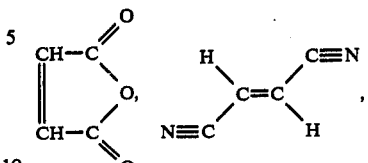
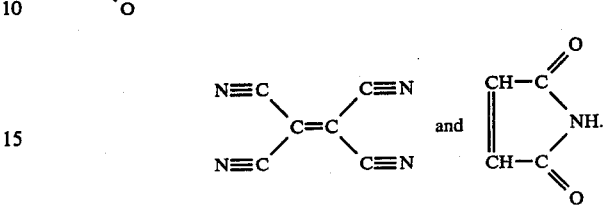

The result of the alternating structure is to produce a low electron density, i.e., electron, deficiency at the olefinic group.

The "electron rich" and "electron deficient" monomers of this invention react to copolymerize only through unsaturated carbon double bonds, i.e., there is no random copolymerization. This provides an approximate 1:1 mol. ratio of "electron rich" monomer:"electron deficient" monomer. This provides a linear, alternating, addition copolymer, leaving any reactive epoxy reactive, R, groups, as hereinabove described, intact. For example, if 2-methyl-1-vinylimidazole is reacted with maleic anhydride, the addition copolymer would have the following composition, according to reaction (I):

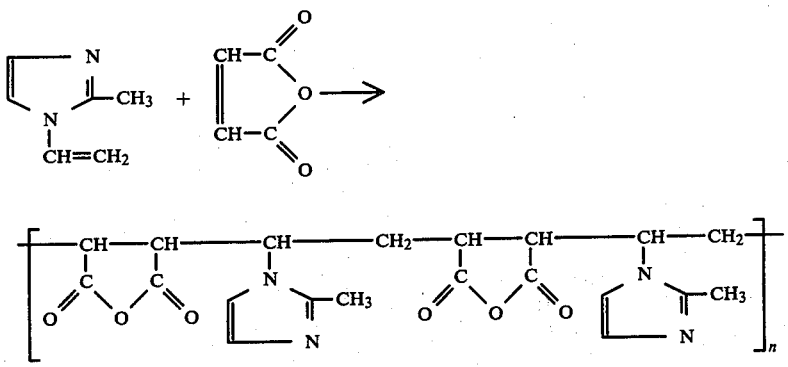

where n can equal from 1 to about 20. It is important that the alternating components possess groups reactive with epoxy, such as amino, hydroxyl, halogen, tertiary nitrogen, anhydride or imide. As shown in these reactions, copolymerization occurs only through the —HC=CH— and —HC=CH$_2$ groups, i.e., the unsaturated carbons.

The resin which can be used in conjunction with the above-described copolymers is not critical to the invention, and any epoxy or other type resin which will combine with the above-described copolymers to form a hardenable mass is suitable for use herein. Epoxy resins are preferred. One type of epoxy resin, which may be used in the invention, is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the chemical structural formula:

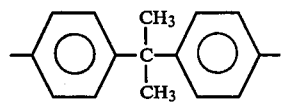

where n is an integer of the series 0, 1, 2, 3 ..., and R represents the divalent hydrocarbon radical of the dihydric phenol. Typically R is:

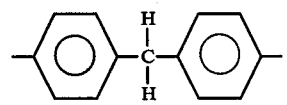

to provide a diglycidyl ether of bisphenol A type epoxy resin or

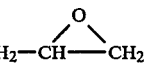

to provide a diglycidyl ether of bisphenol F type epoxy resin.

The bisphenol epoxy resins that may be used in the invention have a 1, 2 epoxy equivalency greater than one. They will generally be diepoxides. By the epoxy equivalency, reference is made to the average number of 1, 2 epoxy groups,

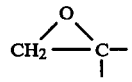

contained in the average molecule of the glycidylether.

Other epoxy resins that can be useful in this invention include polyglycidylethers of a novalac. The polyglycidylethers of a novolac suitable for use in accordance with this invention are prepared by reacting an epihalohydrin with phenol formaldehyde condensates. While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

Other useful epoxy resins include glycidyl esters, hydantoin epoxy resins, cycloaliphatic epoxy resins and diglycidyl ethers of aliphatic diols. The glycidyl ester epoxy resins which can be employed in this invention are non-glycidyl ether epoxy resins containing more than one 1,2 epoxy group per molecule. They are characterized by substitution of the ester bond.

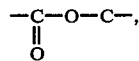

for the ether bond, —O—, and have the chemical structural formula:

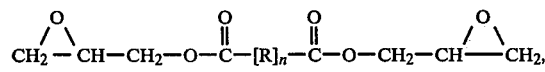

where R is an organic radical substituent selected from the group consisting of R', R'—O—R', R'—COO—R' and mixtures of alkylene groups, having from 1 to 8 carbon atoms, saturated cycloalkylene groups where the ring has 4 to 7 carbons and mixtures thereof, where n is from about 1 to 8.

The hydantoin epoxy resins which can be very advantageously employed in this invention are based on hydantoin, a nitrogen-containing heterocyclic ring having the structure:

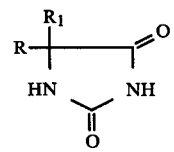

A wide variety of compounds can be formed by reacting the nitrogen positions in the five membered hydantoin ring. The hydantoin ring is readily synthesized from ketones, hydrogen, cyanide, ammonia, carbon dioxide and water. The epoxy resins are formed through reaction of the hydantoin with epichlorohydrin. Hydantoin rings can be linked together for form extended resins analogous in structure to bisphenol A. Polyfunctional resins can also be formed from these chain-extended materials by glycidylization of the hydroxyls and the remaining nitrogens. These heterocyclic glycidyl amine epoxy resins can be represented by the structural formula:

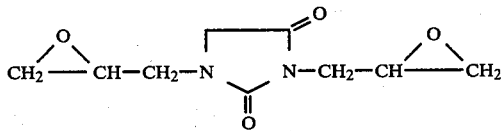

The cycloaliphatic type epoxy resins which can be employed as the resin ingredient in the invention are selected from non-glycidyl ether epoxy resins containing more than one 1,2 epoxy group per molecule. These are gehydrocarbon compounds, such as cyclo-olefins, using hydrogen peroxide or peracids such as peracetic acid and perbenzoic acid. The organic peracids are generally prepared by reacting hydrogen peroxide with either carboxylic acids, acid chlorides or ketones to give the compound R—COOOH.

Examples of cycloaliphatic epoxy resins would include: 3,4-epoxycyclohexylmethyl-3,4-epoxycyclohexane carboxylate (containing two epoxide groups which are part of ring structures, and an ester linkage); vinyl cyclohexane dioxide (containing two epoxide groups, one of which is part of a ring structure); 3,4-epoxy-6-methylcyclohexyl methyl-3,4-epoxy-6-methylcyclohexane carboxylate and dicyclopentadiene.

Other useful epoxy resins which may be used in the invention include diglycidyl ethers of an aliphatic diol having from 2 to 12 carbon atoms. These are low viscosity epoxy resins, usually monomers. Included are diglycidyl ethers of a glycol having from 2 to 12 carbon atoms between the glycidyl ether units, i.e., 2 to 12 carbons in the glycol unit, for example, diglycidyl ether of neopentyl glycol (DGENPG), diglycidyl ethers of 1,4 butane diol, diglycidyl ethers of ethylene glycol, and diglycidyl ethers of polyether glycols, such as, for example, diglycidyl ethers of triethylene glycol and diglycidyl ethers of tetraethylene glycol and their mixtures.

It is useful in some applications to use some of these diglycidyl ethers of aliphatic diols in combination with the other epoxy resins, because the aliphatic diol epoxides are all low viscosity materials, generally between about 5 cps. to 60 cps. at 25° C., and help to reduce the viscosity of the resin composition for impregnation purposes. The epoxy resin system can consist of: (A) a first epoxy resin having a low viscosity (between about 5 cps. to about 60 cps. at 25° C.) i.e., diglycidyl ethers of aliphatic diols and (B) another or second epoxy resin that has a high viscosity (above about 250 cps. and generally between about 250 cps. to about 20,000 cps. at 25° C.) i.e., bisphenol A, bisphenol F, novolacs, glycidyl esters, hydantoins, cycloaliphatics and their mixtures; in the weight ratio of diglycidyl ether of an aliphatic diol low viscosity epoxy resin: second epoxy resin having a high viscosity of from about 1.0:0.5 to about 1.0:4.0.

All of these epoxy resins can be characterized by reference to their epoxy equivalent weight, which is defined as the mean molecular weight of the particular resin divided by the mean number of epoxy radicals per molecule. In the present invention, all of the suitable epoxy resins will have a preferred epoxy equivalent weight of from about 100 to about 500 with a most preferred range of about 150 to about 250. All of these epoxy resins are well known and commercially available. Further reference can be made to Lee and Neville, *Handbook Of Epoxy Resins*, McGraw-Hill, 1967, Ch 2-10 to 2-27 and to U.S. Pat. No. 4,137,275, both herein incorporated by reference, for further details of their structure and manufacture.

The useful organic, carboxylic acid anhydrides that may optionally be used with the copolymer and the epoxy or other type resin include the conventional organic mono- and poly-functional anhydrides. Typical of the monofunctional anhydrides are hexahydrophthalic anhydride, 1-methylhexahydrophthalic anhydride, tetrahydrophthalic anhydride, 1-methyltetrahydrophthalic anhydride, phthalic anhydride, NADIC anhydride, NADIC methylanhydride, dodecenyl succinic anhydride, maleic anhydride and the like. Poly-functional anhydrides which may be employed include pyromellitic dianhydride, polyazelaic polyanhydride, the reaction product of trimellitic anhydride and a glycol, and benziophenone tetracarboxylic acid dianhydride. These organic anhydrides may be used singly or in admixture.

For a number of special purposes, straight epoxy or other type resins may be considered to have certain disadvantages. These disadvantages may include high cost and too great a rigidity for some applications. The epoxy resins may be modified by incorporation of various diluents, flexibilizers and fillers.

Liquid, monoethylenically unsaturated vinyl monomer is one example of a material that can also be used to reduce viscosity of the resin system for impregnation purposes. Examples of useful vinyl monomers include styrene, t-butyl styrene, vinyl toluene, methyl methacrylate, methyl vinyl ketone and the like, and their mixtures. They can be added in amounts up to 300 parts, preferably between 50 parts and 250 parts, per 100 parts of resin. This combination of materials can provide impregnating varnishes having viscosities of between 1 cps. and 25 cps. at 25° C.

Thixotropic agents, such as $SiO_2$ and pigments, such as $TiO_2$, may be used as aids in fluidizing the composition or enhancing the color tones of the cured resins. Similarly, various inorganic particulate fillers, such as silica, quartz, beryllium aluminum silicate, lithium aluminum silicate and mixtures thereof, in average particle sizes of from about 10 microns to 300 microns, may be employed in amounts up to about 100 parts per 100 parts of epoxy resin, to improve electrical properties of the resin formulation and to provide potting compounds for coils, transformers, bushing studs and the like.

In addition, minor effective amounts of known ultraviolet radiation sensitive photoinitiators, such as benzophenone, benzoin methyl ether, diethoxy-xanthanone, azo-bis-isobutyconitrile and the like, can be added to the monomers during copolymerization, to increase yield in conjunction with the use of a U.V. light source, or can be added to the formed copolymer or copolymer-epoxy compositions for U.V. curing procedures.

In the method of this invention, the "electron rich" monomer and the "electron deficient" monomer will spontaneously copolymerize to form water soluble copolymers having an average "electron rich" monomer:"electron deficient" monomer mol. ratio of about 1:1. No catalysts are needed for this reaction, which is preferably carried out by slow addition in a cooled reaction vessel to form a copolymer precipitate.

When necessary to prevent excessive heat buildup, the reaction can be carried out by first dissolving the "electron deficient" monomer in a solvent such as chloroform, methylene chloride, and the like, and then adding the "electron rich" monomer. The choice of the solvent used in this step is not critical, and any solvent effective to form a solution of the two component monomers, and allow precipitation of the copolymer is satisfactory. The copolymer precipitate formed will be insoluble in the chloroform or other suitable solvent used and thus is easily separated by filtration or other techniques. The yield of copolymer generally varies from about 65% to 85%. This yield can be increased by irradiating the monomer reaction mixture with ultraviolet light of about 254 nm wavelength, with or without U.V. sensitizers.

These copolymers can be mixed with water to form a solution. The solution can then be sprayed, painted, dipped or otherwise applied to a suitable substrate, usually a conducting metal such as bare in insulated copper or aluminum. The copolymers can also be added to an epoxy resin, with or without additional anhydride, in the weight ratio of 6 to 60 parts epoxy resin and 0 to 60 parts anhydride per 1 part of linear, alternating copolymer; preferably 30 to 50 parts epoxy resin and 0 to 60 parts anhydride for each 1 part of linear, alternating copolymer. Use of more than 1 part copolymer to 6 parts epoxy results in very brittle cured resins.

When added to the resin, the copolymer acts as a catalyst and produces a massive highly structured "ladder type" rather than "random type" structure. This structure has a high cross linking density. This type of structure is extremely resistant to high temperatures, and would not occur if the monomers were added as separate non-copolymerized components. The use of all carbon or nitrogen atoms in the ring structures of the copolymer also contributes to heat stability.

Usually, the copolymer is added to the epoxy resin at between about 35° C. to 65° C. to achieve complete solubility. After complete mixing to assure a homogeneous resinous composition, the composition can be sprayed impregnated into, or otherwise applied to wire, electrical coils, bus bars or the like, or can have filler added and be poured into a mold to encapsulate various articles. Curing to a solid, hard, thermoset, extremely heat resistant, highly cross-linked resin will generally occur after about 2 hours to 30 hours heating at 125° C. to 165° C., usually 16 hours at 150° C., in a suitable oven, or by using other curing means.

In the embodiment of curing the copolymer when used alone, interaction occurs between the anhydride, imide or nitrile groups and the ring structure of the "electron rich" groups. When an epoxy is added and the admixture is cured, interaction may occur between the epoxy and the R group attached to the "electron rich" portion of the copolymer. It is also possible to cure the copolymer or copolymer-epoxy composition using ultraviolet light, when an ultraviolet photoinitiator has been included in the composition.

While this specification has been directed primarily to epoxy resins, it is to be understood that the copolymers may be used with a wide variety of other well known compatible, organic resins such as polyester resins, isocyanate resins and the like.

Referring now to the drawings, a closed full coil 10, prepared for insertion into an insulated high voltage electrical machine, such as an insulated high voltage electric motor or generator, is illustrated in FIG. 1. The full coil would be disposed within the slots of the stator surrounding the metal motor armature or generator rotor. The full coil comprises an end portion comprising a tangent 12, a connecting loop 14 and another tangent 16 with bare leads 18 extending therefrom. Slot portions 20 and 22 of the coil which sometimes are hot pressed to precure the resin and to form them to predetermined shape and size are connected to the tangents 12 and 16, respectively. These slot portions are connected to other tangents 24 and 26 connected through another loop 28. In general, generator coils are impregnated and then hot pressed prior to winding; motor coils are generally post impregnated "in situ".

The coils are placed in the slots of the stator of an electrical machine and the end windings wrapped and tied together. The uninsulated leads are then soldered, welded or otherwise connected to each other or to the commutator. In the case of a motor, generally the entire motor containing the coils would be placed in an impregnating bath containing a low viscosity version of the copolymer coating composition or copolymer-epoxy coating composition of this invention, and vacuum impregnated. Thereafter the impregnated motor could be removed from the impregnating tank, drained, and ture heated up to about 125° C. to cure the completely reactive composition in the coils.

Figure 2:
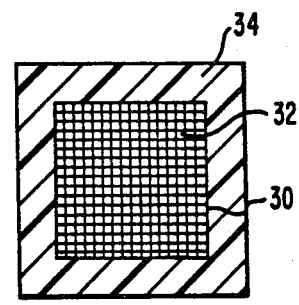
FIG. 2 shows an encapsulated electrical article made with the resinous composition of this invention.

FIG. 2 shows an insulated electrical member such as a coil 30, which has conductors 32, potted or encapsulated in a cured insulating casting 34, the casting being a highly filled coating composition of this invention applied to the member and cured at about 125° C.

Figure 3:
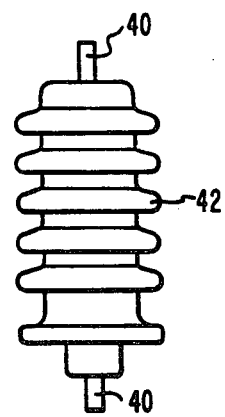
FIG. 3 shows a bushing made with the resinous composition of this invention.

FIG. 3 shows a bushing assembly, where a conducting stud 40 has the coating composition of this invention in highly filled form cast about it to form the bushing insulation 42.

EXAMPLE 1

A water soluble composition was made, consisting of the reaction product of: (1) an water soluble "electron rich" monomer of 2-methyl-1-vinylimidazole, and (2) an "electron deficient" monomer of maleic anhydride, as set out hereinabove in reaction (I). About 100 grams of maleic anhydride was dissolved in 1 liter of chloroform at 25° C. The chloroform solution was then placed in a reaction vessel cooled by an ice bath. Then, 100 grams of 2-methyl-1-vinylimidazole was added dropwise to the chloroform solution over a 10 minute period. After the addition a deep red coloration developed in the solution, followed by the formation of a black-brown copolymer precipitate, insoluble in the chloroform.

The copolymer precipitate was easily filtered, and was found to be insoluble in acetone, toluene and methyl ethyl ketone, but soluble in methanol and water. Infrared spectra were recorded on KBr pellet and Nujol mull samples of the product. The maleic anhydride absorption bands, from the anhydride groups, were clearly visible in these spectra at 1780 cm$^{-1}$ and 1740 cm$^{-1}$, showing that the polymerization had proceeded through the unsaturated carbon double bonds, and that the anhydride groups had remained intact. Alternating copolymerization was also indicated. The product yield in this experiment was about 75% of theoretical yield. Dissolution of 1 gram of the copolymer in 10 grams of water provided a composition having a viscosity of about 100 cps. at 25° C., which could be useful as an insulation composition for impregnating wound copper coils and the like.

EXAMPLE 2

A water soluble composition was made, consisting of the reaction product of: (1) an "electron rich" monomer of 1-vinylimidazole, i.e., N-vinylimidazole, and (2) an "electron deficient" monomer of maleimide. About 200 grams of maleimide was dissolved in 1 liter of chloroform at 25° C. The chloroform solution was then placed in a reaction vessel cooled by an ice bath. Then, 250 grams of 1-vinylimidazole was added dropwise to the chloroform solution over a 10 minute period. After the addition a deep red coloration developed in the solution, followed by the formation of a black-brown copolymer precipitate, insoluble in the chloroform.

The copolymer precipitate was easily filtered, and was found to be insoluble in acetone, toluene and methyl ethyl ketone, but soluble in methanol and water. Infrared spectra were recorded on KBr pellet and Nujol mull samples of the product. The imide absorption bands were clearly visible in these spectra, showing that the polymerization had proceeded through the unsaturated carbon double bonds, and that the imide groups had remained intact. Alternating copolymerization was also indicated. The product yield in this experiment was about 65% of theoretical yield. Dissolution of 1 gram of the copolymer in 10 grams of water provided a composition having a viscosity of about 100 cps. at 25° C., which could be useful as insulation composition for impregnating wound copper coils and the like.

EXAMPLE 3

A water soluble composition was made, consisting of the reaction product of: (1) an "electron rich" monomer of 2-methyl-1-vinylimidazole, and (2) an "electron deficient" monomer of maleimide. This copolymerization was found to be much less exothermic than in EXAMPLE 1, and so no chloroform or ice bath was used. Here, 20 grams of maleimide was added to 30 grams of 2-methyl-1-vinylimidazole over a 10 minute period. After the addition a deep red-orange coloration developed, followed by the formation of a waxy white copolymer precipitate.

The copolymer precipitate was easily filtered, and was found to be insoluble in acetone, toluene and methyl ethyl ketone, but soluble in methanol and water. Infrared spectra were recorded on KBr pellet and Nujol mull samples of the product. The imide anhydride absorption bands were clearly visible in these spectra, showing that the polymerization had proceeded through the unsaturated carbon double bonds, and that the imide groups had remained intact. Alternating copolymerization was also indicated. The product yield in this experiment was about 65% of theoretical yield. Dissolution of 1 gram of the copolymer in 10 grams of water provided a composition having a viscosity of about 100 cps at 25° C., which could be useful as insulation composition for impregnating wound copper coils and the like.

In another sample, the product yield was increased to about 80% of theoretical yield by irradiating the reaction mixtures with U.V. light, at a 254 nm wavelength, during maleimide addition.

EXAMPLE 4

A curable, epoxy-copolymer resinous composition was made. Here, 5 grams of the EXAMPLE 1 copolymer precipitate was added to 40 grams of a liquid hydantoin epoxy resin (solid commercially by Ciba Geigy Corp. under the tradename Hydantoin XB-2793). This provided a weight ratio of copolymer:epoxy resin of 1:8. Partial solubility was achieved upon mixing at 25° C. Complete homogeneous admixture was achieved by warming to 60° C. Two gram samples of the resinous composition were than placed in aluminum dishes in a forced air oven and heated for 2 hours at 150° C. The samples exothermed vigorously and darkened considerably, providing a very hard and somewhat brittle cure, with an extremely high degree of cross-linking and good adherence to the aluminum.

In a similar fashion, 1 gram of the EXAMPLE 1 copolymer precipitate was added to 40 grams of liquid hydantoin XB-2793. This provided a weight ratio of copolymer:epoxy resin of 1:40. Complete homogeneous admixture was achieved by warming to 60° C. Two gram samples of the resinous composition were then placed in aluminum dishes in a forced air oven and heated for 16 hours at 150° C. The samples provided a complete, hard cure with an extremely high degree of cross-linking and good adherence to the aluminum. Both the 1:8 and 1:40 samples showed excellent insulating ability and excellent thermal stability properties.

EXAMPLE 5

A curable, epoxy-copolymer resinous composition was made. Here, 1 gram of the EXAMPLE 1 copolymer precipitate was added to 40 grams of a bisphenol A epoxy resin having an epoxy equivalent weight of between 172 and 176 and a viscosity at 25° C. of about 5,000 cps. (sold commercially by Dow Chemical Corp. under the tradename DER 332). This provided a weight ratio of copolymer:epoxy resin of 1:40. Partial solubility was achieved upon mixing at 25° C. Complete homogeneous admixture was achieved by warming to 60° C. Two gram samples of the resinous composition were then placed in aluminum dishes in a forced air oven and heated for 16 hours at 150° C. The samples provided a complete, hard cure with an extremely high degree of cross-linking and good adherence to the aluminum. The samples showed excellent insulating ability and excellent thermally stability properties.

EXAMPLE 6

A curable, epoxy-copolymer resinous composition was made. Here, 1 gram of the EXAMPLE 1 copolymer precipitate was added to 40 grams of a cycloaliphatic epoxy resin having an epoxy equivalent weight of 133 and a viscosity at 25° C. of about 5,000 cps. (sold commercially by Union Carbide Corp. under the tradename Hydantoin ERL 4221). This provided a weight ratio of copolymerresinous composition were then placed in aluminum dishes in a forced air oven and heated for 16 hours at 150° C. The samples showed an increase in viscosity to about 500,000 cps. at 25° C., showing considerable cure and indicating that a 20 to 24 hour curing cycle would be needed for complete cure.

EXAMPLE 7

A curable, epoxy-copolymer resinous composition was made. Here, 1 gram of the EXAMPLE 2 copolymer precipitate was added to 40 grams of a cycloaliphatic epoxy resin (sold commercially by Ciba Geigy Corp. under the tradename Hydantoin XB-2793). This provided a weight ratio of copolymer:epoxy resin of 1:40. Partial solubility was achieved upon mixing at 25° C. Complete homogeneous admixture was achieved by warming to 60° C. Two gram samples of the resinous composition were then placed in aluminum dishes in a forced air oven and heated for 2 hours at 150° C. The samples provided a complete, hard core with an extremely high degree of cross-linking. The samples showed excellent insulating ability and excellent thermal stability properties.

EXAMPLE 8

An all copolymer coating composition was made. Here, 1 gram of the EXAMPLE 1 copolymer precipitate was dissolved in 10 grams of water, giving a reddish-brown solution with complete solubility. A small amount of this solution was painted on a piece of aluminum metal and baked in a forced air oven for 6 hour at 150° C. A tough hard coating was formed on the aluminum which showed good bonding to the metal. The coating was insoluble in water showing that some interaction between the anhydride groups and pendant imidazole groups and occurred, presumably via reaction with the imidazole ring system to give a highly cross-linked thermoset polymer, having excellent insulating and excellent thermal stability and tensile strength properties.

Similar excellent results would occur in the examples above with substitution of fumaronitrile or tetracyanoethylene, or the use of aromatic ring based structures in place of the nitrogen containing heterocyclic ring structures as the "electron rich" monomer. Thixotroping agents as well as diluents can also be used with these compositions. Fillers could also be added to provide thick potting compounds useful for making bushings or encapsulating various electrical components.

I claim:

1. A curable composition comprising:

(A) a water soluble addition copolymer, consisting of the uncatalyzed reaction product of: (1) a first component electron rich monomer selected from the group consisting of N-vinyl-imidazole, 2-methyl-1-vinylimidazole, N-vinylcarbazole, N-vinylindole, and their mixtures, and (2) a second component monomer selected from the group consisting of maleic anhydride, fumaronitrile, tetracyanoethylene, maleimide, and their mixtures, where the average mol. ratio of first component monomer:-second component monomer is about 1:1, and (B) an epoxy resin, wherein the addition copolymer is mixed with epoxy resin in the weight ratio of from 6 parts to 60 parts epoxy resin per 1 part of addition copolymer.

2. The composition of claim 1, also containing inorganic, particulate filler particles.

3. The composition of claim 1, where the first component monomers have a high electron density at the pendant vinyl group, and the copolymer is characterized as being spontaneously copolymerized, not containing any catalyst materials and having high mechanical and high voltage electrical insulating capability.

4. A curable composition comprising:
(A) a water soluble addition copolymer, consisting of the uncatalyzed reaction product of:
(1) a first component electron rich monomer selected from the group consisting of N-vinylimidazole, 2-methyl-1-vinylimidazole, N-vinylcarbazole, N-vinylindone, monomers having the chemical structures

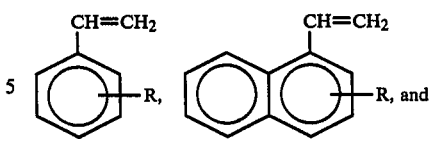

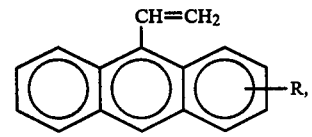

where R is selected from the group consisting of $NH_2$; $NHR'$ where $R'$ is an alkyl group having from 1 to 20 carbon atoms; OH; $(CH_2)_nOH$ where $n=1$ to 20; and $(CH_2)_nX$ where $n=1$ to 20 and $X=Cl,Br,F$ or I; where, no more than one R group is attached to each monomer, whether it contains 1, 2 or 3 aromatic rings, and their mixtures, said first component monomers having a high electron density at the pendant vinyl group, and (2) a second component monomer selected from the group consisting of maleic anhydride, fumaronitrile, tetracyanoethylene, maleimide, and their mixtures where the average mol. rate of first component monomer:second component monomer is about 1:1, and (B) an epoxy resin.

5. The composition of claim 4, where the addition copolymer is mixed with the epoxy resin in the weight ratio of from 6 parts to 60 parts resin per 1 part of addition copolymer.

* * * * *